United States Patent
McFarland et al.

(10) Patent No.: US 11,271,377 B1
(45) Date of Patent: Mar. 8, 2022

(54) CORD MINDER CLIP

(71) Applicant: ZOELLER PUMP COMPANY, LLC, Louisville, KY (US)

(72) Inventors: John McFarland, Guston, KY (US); John Zoeller, Louisville, KY (US); Matthew Byers, Lawrenceburg, KY (US)

(73) Assignee: Zoeller Pump Company, LLC, Louisville, KY (US)

( * ) Notice: Subject to any disclaimer, the term of this patent is extended or adjusted under 35 U.S.C. 154(b) by 15 days.

(21) Appl. No.: 16/587,461

(22) Filed: Sep. 30, 2019

Related U.S. Application Data

(60) Provisional application No. 62/767,102, filed on Nov. 14, 2018, provisional application No. 62/747,835, filed on Oct. 19, 2018.

(51) Int. Cl.
*H02G 3/04* (2006.01)
*F04D 29/00* (2006.01)

(52) U.S. Cl.
CPC ......... *H02G 3/0456* (2013.01); *F04D 29/005* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,962,953 | A | * | 6/1934 | Erwin ............... A41F 17/02 24/566 |
| 3,661,693 | A | * | 5/1972 | Pierson ............ B29C 65/565 428/123 |
| 4,172,578 | A | * | 10/1979 | Pate ................. F16L 3/1075 248/74.3 |
| 4,626,175 | A | | 12/1986 | Riback et al. |
| 5,544,783 | A | * | 8/1996 | Conigliaro ......... B65D 83/303 215/390 |
| 5,703,330 | A | * | 12/1997 | Kujawski ......... B60R 16/0215 138/157 |
| D425,127 | S | * | 5/2000 | Mackey ................ D19/32 |
| 6,408,492 | B1 | * | 6/2002 | Sparks .............. A01K 97/08 24/10 R |
| D508,842 | S | * | 8/2005 | Paolini ................ D8/395 |
| D597,403 | S | * | 8/2009 | Ho ..................... D8/356 |
| 8,038,871 | B1 | | 10/2011 | Durham |

(Continued)

FOREIGN PATENT DOCUMENTS

| WO | WO2010015977 A2 | 2/2010 |
|---|---|---|
| WO | WO2017021221 A1 | 2/2017 |

*Primary Examiner* — Monica E Millner
(74) *Attorney, Agent, or Firm* — Scott R. Cox; Jessica C. Ronald; Jeffery Langer

(57) ABSTRACT

A flexible, arc-shaped cord minder clip for securing power cords or float cords to piping or a float tree of a water, sewage, grinder or sump pump, wherein the degree measure of the arc of the clip is from about 55 to about 270 degrees, wherein the width of the clip is from about 0.5 inch to about 3 inches; and wherein secured to or a molded component of an outer surface of the clip around its circumference are one or more flexible, open c-shaped cord holders. Alternatively, the c-shaped cord holder may be formed as a component of the clip and may be structured to hold the cord against a surface of the piping or float tree.

13 Claims, 6 Drawing Sheets

(56) References Cited

U.S. PATENT DOCUMENTS

| | | | | |
|---|---|---|---|---|
| 8,398,034 B2 * | 3/2013 | Lambert | ............... | F24T 10/15 |
| | | | | 248/68.1 |
| 8,529,228 B1 | 9/2013 | Thompson | | |
| D845,425 S * | 4/2019 | Yaxley | ............... | D22/108 |
| 10,823,312 B2 * | 11/2020 | Vaccaro | ............... | H02G 3/32 |
| 10,883,637 B2 * | 1/2021 | Endara | ............... | F16L 3/222 |
| 2006/0192034 A1 | 8/2006 | Gavin | | |
| 2006/0201869 A1 | 9/2006 | Collins et al. | | |
| 2006/0272203 A1 | 12/2006 | Weber | | |
| 2007/0246613 A1 * | 10/2007 | Kennedy | ............... | H02G 3/32 |
| | | | | 248/56 |
| 2012/0085577 A1 * | 4/2012 | Eshima | ............... | H02G 3/32 |
| | | | | 174/70 R |
| 2013/0175407 A1 * | 7/2013 | Williams | ............... | F16L 3/223 |
| | | | | 248/68.1 |
| 2014/0259620 A1 * | 9/2014 | Hicks | ............... | F16L 3/223 |
| | | | | 29/525.01 |
| 2017/0079221 A1 * | 3/2017 | Adams | ............... | F16L 7/00 |

* cited by examiner

FIGURE 4
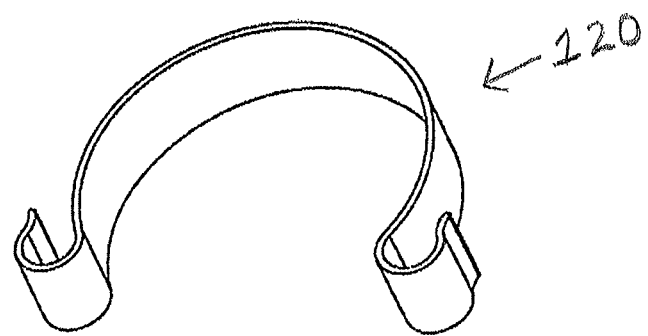
FIGURE 5
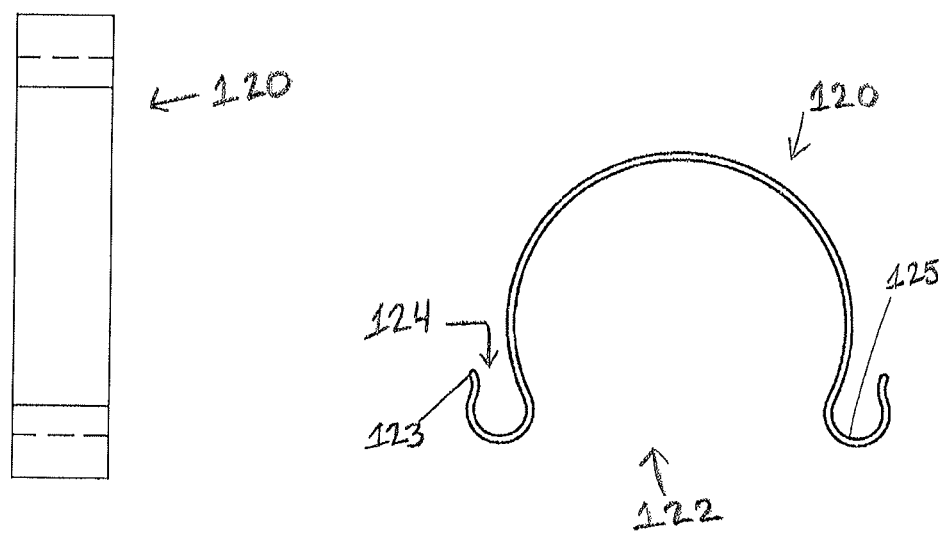
FIGURE 6

CORD MINDER CLIP

CROSS REFERENCE TO RELATED APPLICATION

This Application claims priority from provisional application Ser. No. 62/747,835, filed Oct. 19, 2018 and provisional application Ser. No. 62/767,102, filed Nov. 14, 2018.

BACKGROUND OF INVENTION

The present invention relates to fluid pumping equipment, particularly sump pumps. For purposes of this application, the term "pumps" or "sump pumps" include sump pumps, sewage pumps, grinder pumps and other similar water pumps. More particularly, the present invention relates to a useful device for securing cords, particularly float switch cords and power cords, in position on a device that is secured to or associated with a sump pump, such as discharge piping or a float tree.

Sump pumps are utilized for many applications, which may be of long or short-term duration. Modern sump pumps contain switching devices which automatically turn the sump pump on and off, as required.

Several types of automatic power switches have been provided to activate sump pumps. For example, floats are commonly utilized with sump pumps systems, such as shown, for example, in U.S. Pat. No. 8,038,871. When using these float switches, it is necessary that the float be connected to an electric cord which extends to the pump to carry a signal to activate and deactivate the sump pump. Unlike rigid ball float rod operated sump pumps, wherein the changing attitude of the connecting rod operates the switch, floats operate sump pumps based on the orientation of the switch float housing. The switch float housing attitude of orientation is dependent upon the cable length and fluid depth. Therefore, the level of liquid in the sump that is required to achieve a switch float attitude orientation sufficient to turn the float switch on and energize the sump pump is determined by the length of the cable which extends among the switch float, its attachment point and the sump pump.

Accordingly, sump pumps of this type with switch floats have lengthy cables which extend from the float to the sump pump, usually through a control panel. It is necessary that these cables be secured in location, generally to an element of the sump pump system so that they properly operate and do not interfere with the operation of the sump pump.

Currently, a fixed length of a multistrand cable is frequently utilized to releasably tether the cable to a component of the sump pump system at a desired height and location. For example, the cable can be secured on discharge piping or a float tree of the sump pump system. In prior art systems, these cables were secured to the float tree or the discharge piping of the sump pump system by conventional means of securing, such as a stainless steel hose clamp, or zip ties made of nylon material. An alternative embodiment, where the floats are fixed in place, is shown in the mounting system disclosed by U.S. Pat. No. 8,038,871. See also the securing systems disclosed by U.S. Pat. No. 4,626,175, WO 2017/021221 A1 and WO 2010/015977 A2.

Notwithstanding these systems for securing float switch cables to the sump pump system, the existing securing system, such as hose clamps and zip ties, are cumbersome to use and difficult to remove if modifications need to be made or if the sump pump and/or float switches need to be removed for repair. Further, steel hose clamps corrode in a wastewater environment and nylon zip ties can be adversely affected by sewage gasses and become brittle and break over time.

One object of the disclosure is a new and improved cord minder clip for securing cords to discharge piping or a float tree of a sump pump system, wherein the cord minder clip includes a flexible, arch-shaped clip which is securable to a component of the sump pump system, wherein there is located on the clip a series of c-shaped cord holders, preferably two of these c-shaped cord holders secured to or molded as an element of these clip to form two portion, c-shaped cord holders secured back-to-back, such that an opening of each c-shaped cord holder faces in opposite directions.

The cord minder clip is preferably made of PVC, ABS, polyethylene plastic or other such materials that are impervious to sewer gases and the impact of wastewater. Alternatively, the cord minder clip can be made of any material that is resistant to the toxic, corrosive and caustic liquids and gases contained within a sump, such as stainless steel or other metallic substances. Further, the material can be painted or coated with an epoxy coating that is resistant to these liquids or gases.

Another object of the disclosure is a new and improved cord minder clip for securing cords to discharge piping or the float tree of a sump pump system, wherein the cord minder clip comprises a metal or plastic strip which is securable or clippable to the discharge piping or the float tree and which is formed into an arc-shape of sufficient size to be clippable or securable to the discharge piping or float tree, wherein at least the ends of the arc-shaped strips are formed or bent to create a c-shaped, outward facing opening or openings of sufficient size and shape to receive and hold the cords of components of the sump pump system.

A further object of the disclosure is a new and improved cord minder clip which is securable or clippable to discharge piping or the float tree of a sump pump system comprising a metal or plastic strip formed into an arc-shape, wherein inner facing openings are provided in the strip to receive and hold cords from the float switch or sump pump against the discharge piping or float tree onto which the metal or plastic strips are clipped or secured.

BRIEF DESCRIPTION OF THE DRAWINGS

FIG. 4 is a perspective view of a second embodiment of the cord minder clip for securing float switch or sump pump cords to discharge piping of a sump pump system.

FIG. 5 is a bottom view of the cord minder clip of FIG. 4.

FIG. 6 is a side view of the cord minder clip of FIG. 4.

DESCRIPTION OF A PREFERRED
EMBODIMENT OF THE INVENTION

Figure 1:
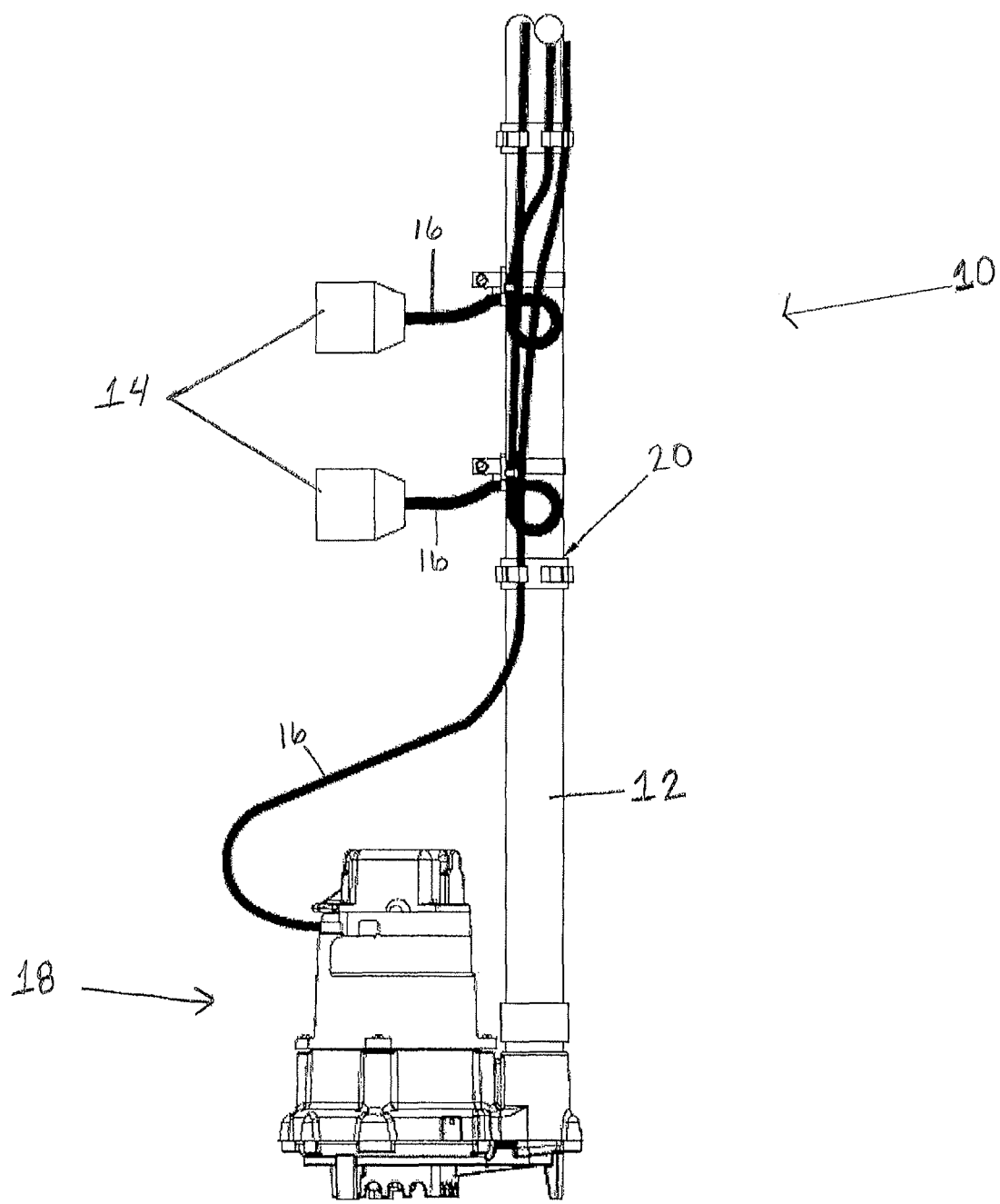
FIG. 1 shows a side view of a sump pump system with cord minder clips securing float switch and/or sump pump power cords to discharge piping of the system.
Figure 2:
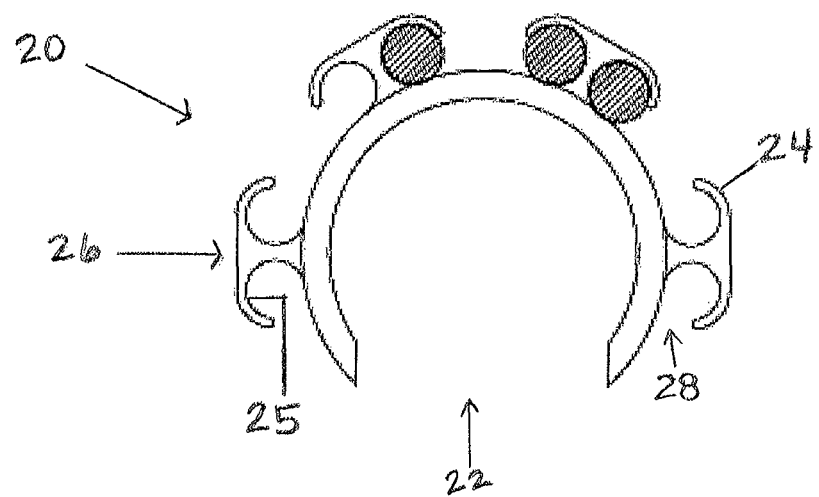
FIG. 2 is a side view of the cord minder clip of FIG. 1, wherein three cords are secured within c-shaped openings in the clips that are secured to or a molded component of the cord minder clip.
Figure 3:
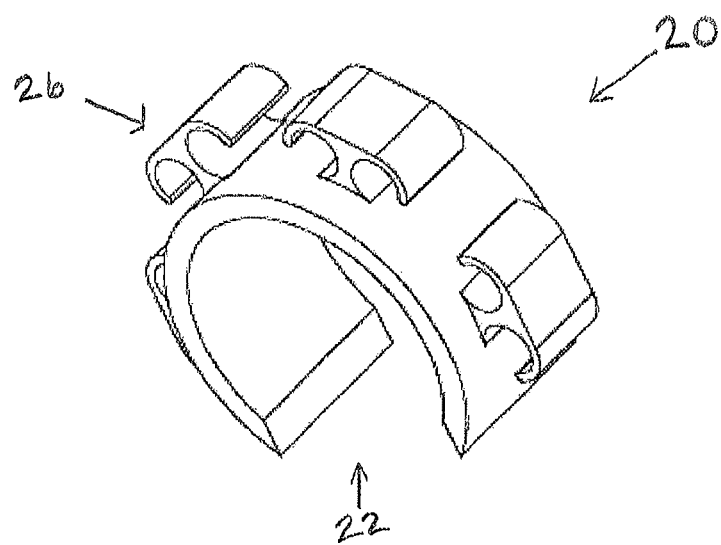
FIG. 3 is a perspective view of the cord minder clip that is secured to the sump pump system, as shown in FIG. 1.

With reference to the drawings, and in particular to FIGS. 1-3 thereof, there is disclosed one embodiment of a cord minder clip for securing cords to piping or a float tree of a water, sump, sewage or grinder pump system.

In one embodiment, as best illustrated in FIG. 1, a sump pump system (10) is provided which has attached thereto discharge piping (12). Secured to the sump pump system (10) are two floats (14) with cords (16) which extend from the floats (14) to the sump pump (18). The floats (14) are utilized to activate and deactivate operation of the sump pump (18) depending on the level of water within a sump in which the sump pump (18) is placed.

A cord minder clip (20), as shown in detail in FIGS. 2 and 3, is secured to the discharge piping (12) of the sump pump (18), as shown in FIG. 1. The cord minder clip (20) in this embodiment is a flexible, arc-shaped clip, wherein the degree measure of the arc of the clip can be any degree measure which secures the clip to the piping and preferably ranges from about 55 to about 270 degrees. The size of the opening (22) in the arc of the clip is determined by the diameter of the piping (12) to which the clip is secured. Because the cord minder clip is flexible, it will snap over and onto the piping and be held securely in place to the piping, yet can be removed, for example, for service of the sump pump or the float switches. Further, its height and thickness can be modified as desired.

In an alternative embodiment to merely snapping onto and over piping, the cord minder clip can be secured to the piping. For example, the cord minder clip can be secured in place on the piping by gluing it in place. As a further alternative, the cord minder clip can be movably secured in a particular location on the piping by use of a device, such as a screw system that extends perpendicular through the cord minder clip to impact against the piping (not shown). This system permits securing the clip in a fixed position but permits removal or relocation of the cord minder clip on the piping. In situations where the cord minder clip is secured against the piping, such as by gluing, the degree measure of the arc thereof can be reduced significantly to as small as 55 degrees or so. Further, the method of securing the cord minder clip to the piping can vary depending on the composition of the cord minder clip.

The material used for the clip and the thickness and width of the clip are determined so as to retain significant flexibility yet provide resistance to the exposure of the clip to the types of liquids and gases that are present in conventional sumps. Because sump pumps have a long life span, for stability, it is important that these clips be sufficiently thick, preferably at least about ⅛ inch to about ¾ inch and be made of a resistant material such as ABS, PVC, or polyethylene plastic or other such resistant material. Alternatively, the cord minder clip can be made of any material that is resistant to the liquids and gases contained within a sump, such as stainless steel or other metallic substances. Further, if metal clips are used, they may be coated with materials to prevent or limit corrosion, such as an epoxy or baked-on powder coating. These clips are from about 0.5 inch to about 3 inches, preferably 1 inch to 1½ inch, in width to provide sufficient space for the c-shaped cord holders which are secured to or a molded component of the cord minder clip, as shown in FIGS. 2 and 3.

Preferably, a series of two portion, c-shaped cord holders secured back-to-back (26), as shown for example in FIG. 3, are present on or secured to or a molded component of the cord minder clips. In an alternative embodiment the c-shaped cord holders may comprise one or more holders that only secure a single cord. In one embodiment, as shown in FIG. 2, there are eight c-shaped cord holders, divided into a series of four separate two portion, c-shaped cord holders secured back-to-back, to accommodate eight separate cords that can be secured to the cord minder clip. The overall shape and width of these two portion, c-shaped cord holders secured back-to-back is not particularly critical and is dependent upon the types of cords to be held, the composition of the cord holders, and molding options. Notwithstanding, the diameter of each opening in the c-shaped cord holder (28) is preferably slightly smaller than the diameter of the cords that are to be held by the c-shaped cord holder so that they can be securely retained. Further, the opening in the c-shaped cord holder through which the cord to forced should be sufficient so that the cord can be snapped into place within the c-shaped opening. Thus, the c-shaped cord holder is also flexible yet of sufficient strength to permit repeated placement and removal of the cords through the openings of these c-shaped cord holders. The c-shaped cord holder also may be modified to prevent the cords from slipping within the c-shaped cord holders by roughening up an inside surface (25) thereof. This roughness may also be in the form of a notch or notches or an extended key feature. The c-shaped cord holders may also be made with differing diameters to accommodate various cord diameters. Thus, cord minder clips may have various c-shaped cord holder diameters.

Figure 7:
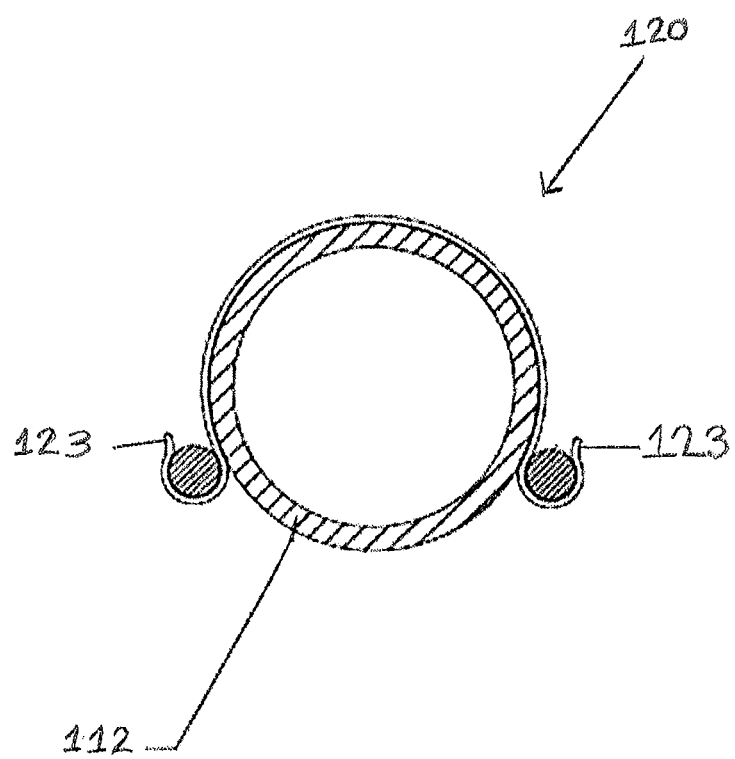
FIG. 7 is a side view of the cord minder clip of FIG. 4 clipped against a surface of discharge piping or float tree and holding two cords from the sump pump system.

As best shown in FIGS. 4 through 7 is a second embodiment of the cord minder clip (120). This second embodiment of a cord minder clip (120), as shown in FIG. 7, is secured to discharge piping (112) of a sump pump. The cord minder clip (120) of this embodiment is a flexible, plastic or metal strip formed into an arc-shape. The opening (122) in the arc of this cord minder clip is determined by the diameter of the piping (112) to which the clip is secured. The arc of the clip can be of any size that is sufficient to be held by the discharge piping and is preferably from about 100 to about 300 degrees. The size of the opening in the arc of the clip is determined by the diameter of the piping to which the clip is secured. Because the cord minder clip of this embodiment is flexible, it snaps over and onto the piping and is held securely in place to the piping, yet can be removed, for example, for service of the sump pump or floats. Further, its height may be modified as desired.

In an alternative embodiment to merely snapping onto and over the piping, the cord minder clip of this embodiment can be secured to the piping (not shown). For example, the cord minder clip can be secured onto the piping by gluing it in place. As a further alternative, the cord minder clip of this second embodiment can be moveably secured in a particular location on the piping by a device, such as a screw system, that extends perpendicularly through the cord minder clip to impact against the piping or by any other system that secures the cord minder clip to the piping. The method of securing the cord minder clip to the piping can vary depending on the composition of the cord minder clip.

In this second embodiment, ends (123) of the cord minder clip are bent or molded to form an outward facing, generally c-shaped opening or openings (124) of sufficient size to receive and hold cords from the float switch or sump pump, as shown, for example, in FIGS. 4 and 6. The surface (125) of these openings formed at the ends (123) of these cord minder clip may be modified on the interior to assist in the gripping of cords which are placed within these openings, such as by roughening the surface thereof. Other means of enhancing the gripping of the cords within these openings may also be used. Further, the size of these openings in the ends of the cord minder clips can vary in diameter to accommodate various diameters of cords which are held by the cord minder clip.

The cord minder clips of this embodiment can be formed from plastic or metal, as long as the material is resistant to the toxic, caustic and corrosive liquids and gases that are often contained within sumps. Further, if metal clips are used, they may be coated with materials to prevent or limit corrosion, such as an epoxy or baked-on powder coating.

If a plastic material is used for the cord minder clips of this embodiment, it should have sufficient thickness and width to retain significant flexibility yet provide resistance to exposure of the clip to the types of toxic liquids and gases that are present in sumps. Because sump pumps have a long-life span, for stability, it is important that clips be sufficiently thick, preferably at least about ⅛ inch to about ¾ inch and be made of resistant materials such as ABS, PVC, or polyethylene plastic or other such highly resistant plastic or metal materials.

As best shown in FIGS. 8 through 11 is a third embodiment of a cord minder clip (220). This cord minder clip is shown secured to discharge piping (212) in FIG. 11.

Figure 8:
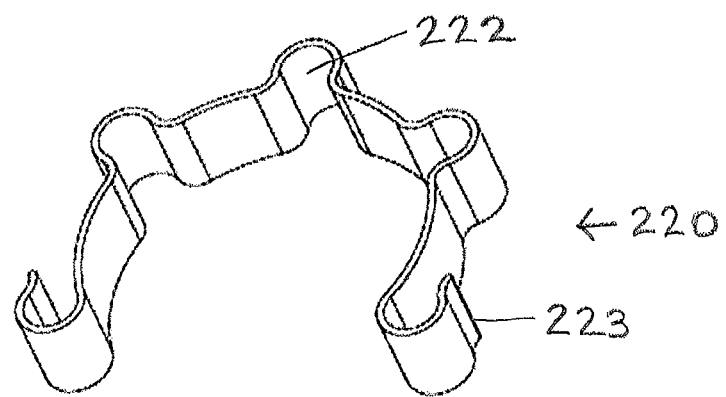
FIG. 8 is a perspective view of a third embodiment of the cord minder clip for securing float switch or sump pump cords to discharge piping of a sump pump system.
Figure 9:
FIG. 9 is a bottom view of the cord minder clip of FIG. 8.
Figure 10:
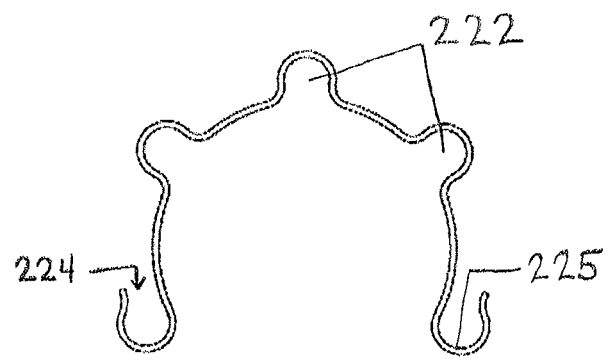
FIG. 10 is a side view of the cord minder clip of FIG. 8.

In this embodiment the cord minder clip (220), which is securable or clippable to discharge piping or a float tree of a sump pump system, is formed into an arc shape with inner facing openings (222), as shown in FIGS. 8 and 10, which openings hold cords against the surface of the discharge piping or float tree. Further, the cord minder clip also may have ends (223) thereof which are bent or molded to form an outward facing, generally c-shaped opening (224) of sufficient size to receive or hold cords from the float switches or sump pumps which are similar in size and shape to those of the second embodiment.

This cord minder clip (220) of this embodiment is a flexible, plastic or metal arc-shaped clip, wherein the degree of measure of arc of the clip forms an opening (222) with a range of the arc from about 100 to about 300 degrees. The size of the opening (222) in the arc is determined by the diameter of the piping to which the clip is secured. Because the cord minder clip of this embodiment is flexible, it snaps over and onto the piping and is held securely in place to the piping, yet can be removed for service of the sump pump. Further, its height may be modified, as desired.

In an alternative embodiment to merely snapping the clip onto and over the piping, the cord minder clip (220) of this third embodiment can be secured to the piping (not shown). For example, the cord minder clip can be secured onto the piping by gluing it in place. As a further alternative, the cord minder clip can be moveably secured in a particular location on the piping by a device, such as a screw system that extends perpendicular through the cord minder clip, to impact against the piping. This system permits removal and relocation of the cord minder clip on the piping. Any means or method of securing the cord minder clip to the piping is within the scope of the invention. The method of securing the cord minder clip to the piping can vary depending on the composition of the cord minder clip.

Figure 11:
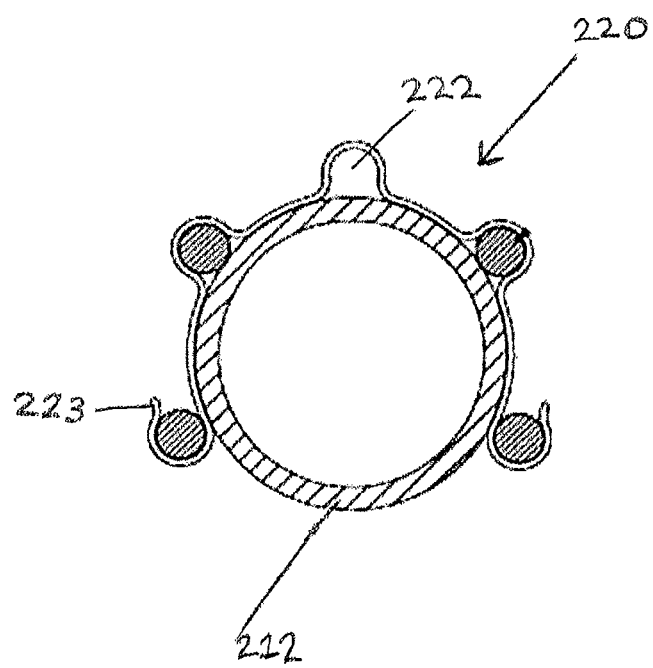
FIG. 11 is a side view of the cord minder clip of FIG. 8 clipped against a surface of discharge piping and holding four cords from the sump pump system.

The cord minder clip of the third embodiment, as shown in FIGS. 8 and 11, include three inner facing openings (222), although this number may be modified as desired. The arc of these openings is not particularly critical as they hold the cords against the surface of the discharge piping (212). The number, shape and size of these openings can vary depending on the size of the cords and the number of cords to be held in place against the piping. Further, outer facing openings (224), similar in size and shape to those shown in the second embodiment, can also be an element of the cord minder clip of this embodiment. The inner surfaces (225) of these inner facing openings may be modified in any acceptable manner to assist in the gripping of the cords that are held in place by these clips.

The composition of the cord minder clip of this third embodiment can be plastic or metal. If a plastic material is used for preparation of the clip, the thickness and width of the clip should be sufficient to permit significant flexibility yet provide resistance to the exposure of the clip to the types of toxic, caustic and corrosive liquids and gases that are present in conventional sumps. Because sump pumps have a long life span, for stability, it is important that these clips be sufficiently thick, preferably at least about ⅛ inch to about ¾ inch, and be made of a resistant, plastic material, such as ABS, PVC, or polyethylene plastic or other such similar resistant plastic materials. Alternatively, the cord minder clip (220) can be made of metal materials that are resistant to the liquids and gases contained in sumps, such as stainless steel, or a metal clip which is coated with a material which is impervious to corrosion, such as an epoxy or baked-on powder coating.

The foregoing is considered illustrative only of the principles of disclosure. Further modifications and changes may readily occur to those skilled in the art in this disclosure. It is not intended to limit the disclosure of the exact construction and operation shown and described. Accordingly, suitable modifications of equivalents may be resorted to and are within the scope of the disclosure.

LIST OF COMPONENTS

10—Sump pump system
12—Discharge piping
14—Floats
16—Cords
18—Sump pump
20—Cord minder clip
22—Opening in arc of clip
24—c-shaped cord holder
25—inside surface of 24
26—two portion, c-shaped cord holders secured back-to-back
28—opening in c-shaped cord holder
120—Cord minder clip
112—Discharge piping
122—Opening
123—ends of cord minder clip
124—c-shaped openings
125—surface of c-shaped openings
220—Cord minder clip
212—Discharge piping
222—inner facing openings
223—ends of cord minder clip
224—outer facing c-shaped openings
225—inner surface of 224

The invention claimed is:

1. A cord minder clip for securing power cords or float cords to piping or a float tree of a water, sump, sewage or grinder pump comprising a flexible, arc-shaped clip,
   wherein a degree measure of an arc of the clip is from about 55 degrees to about 270 degrees,
   wherein a width of the clip is from about 0.5 inch to about 3 inches;
   wherein secured to or a component of an outer surface of the clip around its circumference is at least one flexible, open, c-shaped cord holder;
   wherein two c-shaped cord holders are secured next to each other back-to-back on the outer surface of the clip to form a two portion, c-shaped cord holder; and
   wherein the openings in the two portion, c-shaped cord holders are facing at an angle of about 180 degrees in an opposite direction.

2. The cord minder clip of claim 1, wherein the openings of the at least one c-shaped cord holder have a diameter less than a diameter of the cords to be held.

3. The cord minder clip of claim 1 comprised of PVC, polyethylene or ABS plastic.

4. The cord minder clip of claim 1 wherein the openings in the two portion, c-shaped cord holders have different diameters.

5. The cord minder clip of claim 1 where an interior surface of the at least one c-shaped cord holders is roughened.

6. A cord minder clip for securing power cords or float cords to piping or a float tree of a water, sump, sewage or grinder pump comprising a flexible, arc-shaped clip,
   wherein a degree measure of an arc of the clip is from about 200 degrees to about 300 degrees,
   wherein a width of the clip is from about 0.5 inch to about 3 inches;
   wherein an end of the arc of the clip forms an outer facing opening of sufficient size and shape to receive and hold cords from the pump,
   and further comprising at least one inner facing opening in the inner surface of the arc shaped clip,
   wherein the at least one inner facing opening clamps power cords or float cords against the piping or the float tree.

7. The cord minder clip of claim 6, wherein the opening is a c-shaped opening.

8. The cord minder clip of claim 7, wherein the opening of the c-shaped opening has a diameter less than a diameter of the cords to be held.

9. The cord minder clip of claim 7, where an interior surface of the c-shaped cord holder is roughened.

10. A cord minder clip for securing power cords or float cords to piping or a float tree of a water, sump, sewage or grinder pump comprising a flexible, arc-shaped clip,
    wherein the clip comprises an arc-shaped clip with an angle measure of the arc from about 200 degrees to about 300 degrees,
    wherein a width of the arc-shaped clip is from about 0.5 inch to about 3 inches;
    wherein multiple inner facing c-shaped openings are provided in and evenly dispersed around the arc of an inner surface of said arc-shaped clip; and
    wherein the multiple inner facing c-shaped openings clamp power cords or float cords against the piping or the float tree.

11. The cord minder clip of claim 10, wherein the inner facing c-shaped openings have a diameter less than a diameter of the cords to be held.

12. The cord minder clip of claim 10 where an interior surface of the inner facing c-shaped openings is roughened.

13. The cord minder clip of claim 10, wherein an end of the arc-shaped clip forms an outer facing opening of sufficient size and shape to receive and hold a cord from the pump.

* * * * *